United States Patent
Shikata et al.

(10) Patent No.: US 8,207,077 B2
(45) Date of Patent: Jun. 26, 2012

(54) ABRASION-RESISTANT SINTERED BODY, SLIDING MEMBER, AND PUMP

(75) Inventors: Kunihide Shikata, Satsumasendai (JP); Teruaki Katagiri, Kirishima (JP)

(73) Assignee: Kyocera Corporation, Kyoto (JP)

( * ) Notice: Subject to any disclaimer, the term of this patent is extended or adjusted under 35 U.S.C. 154(b) by 140 days.

(21) Appl. No.: 12/740,346

(22) PCT Filed: Oct. 28, 2008

(86) PCT No.: PCT/JP2008/069566
§ 371 (c)(1),
(2), (4) Date: Apr. 28, 2010

(87) PCT Pub. No.: WO2009/057603
PCT Pub. Date: May 7, 2009

(65) Prior Publication Data
US 2010/0234207 A1    Sep. 16, 2010

(30) Foreign Application Priority Data

Oct. 29, 2007    (JP) ................................. 2007-279859
Oct. 29, 2007    (JP) ................................. 2007-279860
Mar. 19, 2008    (JP) ................................. 2008-070784
Mar. 19, 2008    (JP) ................................. 2008-070785

(51) Int. Cl.
*C04B 35/111* (2006.01)

(52) U.S. Cl. ........................................ 501/127; 501/128
(58) Field of Classification Search .................. 501/127, 501/128
See application file for complete search history.

(56) References Cited

U.S. PATENT DOCUMENTS

| | | | |
|---|---|---|---|
| 5,652,189 | A | 7/1997 | Trabelsi |
| 5,658,838 | A | 8/1997 | Trabelsi |
| 6,143,678 | A | 11/2000 | Yamamoto et al. |
| 6,383,963 | B1 | 5/2002 | Yamamoto et al. |
| 2006/0194690 | A1* | 8/2006 | Osuzu ........................ 501/127 |

FOREIGN PATENT DOCUMENTS

| | | | |
|---|---|---|---|
| JP | 3-31664 | B | 5/1991 |
| JP | 05099195 | * | 4/1993 |
| JP | 8-277160 | A | 10/1996 |
| JP | 9-87008 | A | 3/1997 |
| JP | 11-71168 | A | 3/1999 |
| JP | 3431179 | B2 | 7/2003 |
| JP | 2004-352572 | A | 12/2004 |
| JP | 2004-352573 | A | 12/2004 |
| JP | 3949950 | B2 | 7/2007 |

* cited by examiner

*Primary Examiner* — Karl Group
(74) *Attorney, Agent, or Firm* — Birch, Stewart, Kolasch & Birch, LLP (57) ABSTRACT

The present invention provides a dense, abrasion resistant ceramic. The ceramic of the invention includes alumina crystal particles and a grain boundary phase. The invention also includes an abrasion resistant sliding member and a pump comprising the same.

8 Claims, 4 Drawing Sheets

Dynamometer — Sample (b)

Fig. 4

ABRASION-RESISTANT SINTERED BODY, SLIDING MEMBER, AND PUMP

This application is the national stage application of International Application PCT/JP2008/069566, filed on Oct. 28, 2008 and designating the United States of America. This application also claims priority under 35 USC §119(a) of Japanese applications JP2007-279859 filed Oct. 29, 2007, JP2007-279860 filed Oct. 29, 2007, JP2008-070784 filed Mar. 19, 2008 and JP2008-070785 filed Mar. 19, 2008.

TECHNICAL FIELD

The present invention relates to an abrasion-resistant sintered body, a sliding member, and a pump.

BACKGROUND ART

Alumina sintered bodies have heretofore been used for a seal, a slide ring, a pump, a piston, and the like that are required to have an abrasion-resistant property.

For example, Patent Document 1 describes use of the alumina sintered bodies for a radial or axial slide bearing in a centrifugal pump, a slide ring in a rotatable mechanical seal, and a piston or a piston casing for a reciprocating pump.

The alumina sintered body described in Patent Document 1 contains 1.2 to 6 mass % of $Fe_2O_3$, 0.1 to 0.3 mass % of MgO, 0.1 to 0.6 mass % of $SiO_2$, 2.5 mass % or less of $Mn_2O_4$, 1.1 mass % or less of $Cr_2O_3$, and 90 to 98 mass % of $Al_2O_3$ as a residual part, and has an average grain size of the crystalline component is 5 to 15 μm, and the rate of a glass phase based on $Fe_2O_3$ is 2 to 10 mass % with respect to the $Al_2O_3$ content.

Also, as a sintered body formed of fine alumina grains and coarse alumina grains, there has been known an inorganic sintered ultraprecise measurement table obtained by sintering a mixture of coarse grains consisting mainly of corundum and having a grain diameter of 0.2 to 5 mm and fine grains having a grain diameter of 5 μm or less at a temperature of 1300 to 1500° C. so as to attain a porosity of 0.1 to 20% and performing polishing processing to flatten a working surface (see Patent Document 2).

Also, there has been known a manufacturing method for heat shock resistant alumina/zirconia-based firing jig, which is obtained by forming a molded article by mixing 20 to 70 mass % of coarse alumina grains having an average grain diameter of 30 to 200 μm, 20 to 70 mass % of fine alumina grains having an average grain diameter of 1 to 5 μm, and 5 to 30 mass % of zirconia grains having an average grain diameter of 5 to 30 μm, firing the molded article, and finely dispersing the zirconia grains in an aluminous substance binding the coarse alumina grains (see Patent Document 3).

Patent Document 1: Japanese Patent No. 3431179
Patent Document 2: Japanese Examined Patent Publication No. 3-31664
Patent Document 3: Japanese Patent No. 3949950

DISCLOSURE OF THE INVENTION

Problems to be Solved by the Invention

In the alumina sintered body described in Patent Document 1, the sintered body having an average grain diameter after sintering of about 8 μm is obtained by using the alumina material having a grain diameter of 1 to 2.5 μm, and such an alumina sintered body has a problem of a low abrasion-resistant property since the amount of large diameter alumina grains is small.

Also, since there are a large number of pores between alumina grains due to too large a size of the alumina grains in the alumina sintered body described in Patent Document 2, strength is insufficient and there is a risk of breakage of the alumina sintered body when used as a shaft or a bearing.

Since the alumina/zirconia-based firing jig described in Patent Document 3 contains proper number of pores, it is difficult to obtain a jig having an open porosity of 0.1% or less, and the obtained jig has a problem of a small bending strength of 33 to 68 MPa.

An object of the present invention is to provide an abrasion-resistant sintered body which is dense and improved in an abrasion-resistant property, a sliding member, and a pump.

Means for Solving the Problems

As a result of researches about the above-described problems, the present inventors and the like found that it is possible to obtain a sintered body that is dense, has constant strength, and is reduced in abrasion volume even when another member slides on a surface of the sintered body by: using, as alumina crystal grains forming the sintered body, large diameter alumina grains having a diameter of 10 μm or more and small diameter alumina grains having a grain diameter of 5 μm or less; setting an area rate of the large alumina grains on the sintered body surface to 35 to 65%; and setting an open porosity to 0.1% or less, thereby accomplishing the present invention.

More specifically, an abrasion-resistant sintered body of the present invention essentially comprises alumina crystal grains and a grain boundary phase and has an open porosity of 0.1% or less. The alumina crystal grains comprise a large diameter alumina grain having a grain diameter of 10 μm or more and a small diameter alumina grain having a grain diameter of 5 μm or less, and an area rate of the large diameter alumina grain on a surface of the sintered body is 35 to 65%.

Since the area rate of the large diameter alumina grains having the grain diameter of 10 μm or more on the sintered body surface is 35 to 65% in the abrasion-resistant sintered body, a ceramic member slides on a surface of the large diameter alumina grains in the case where the ceramic member slides on the sintered body surface to suppress abrasion. Also, the abrasion-resistant sintered body of the present invention is dense and improved in strength due to the open porosity of 0.1% or less.

Also, the abrasion-resistant sintered body of the present invention is characterized in that the area rate of the small diameter alumina grains on the sintered body surface is 15 to 40%. It is possible to enhance strength of the abrasion-resistant sintered body since the area rate of the small diameter alumina grains having the grain diameter of 5 μm or less is as large as 15 to 40%.

Also, the abrasion-resistant sintered body of the present invention is characterized in that the large diameter alumina grains comprise one or more pores therein. In the case of grinding processing, since the pores exist inside the large diameter alumina grains in such an abrasion-resistant sintered body, cracks are initiated at the pores of the large diameter alumina grains and grains are removed in a grinding processing, thereby reducing grinding resistance and improving processability.

Further, the abrasion-resistant sintered body of the present invention is characterized by containing 90 to 98 mass % of Al in terms of $Al_2O_3$ with respect to the total amount of the sintered body. Since it is generally difficult to form a binodal structure containing the large diameter alumina grains of the grain diameter of 10 μm or more and the small diameter alumina grains of the grain diameter of 5 μm or less in the case where the sintered body contains 90 to 98 mass % of Al in terms of $Al_2O_3$ with respect to the total amount of the sintered body, the present invention is suitably used.

Also, the abrasion-resistant sintered body of the present invention is characterized by containing 1 mass % or less of Si in terms of $SiO_2$ with respect to the total amount of the sintered body. In such an abrasion-resistant sintered body, though grinding resistance is a little increased since the predetermined amount of Si is contained, strength is improved to make it possible to attain sufficient strength even when the sintered body is used for a columnar shaft having a small diameter, for example, thereby improving long term reliability of a pump.

Also, the abrasion-resistant sintered body of the present invention is characterized by containing 0.22 mass % or less of Si in terms of $SiO_2$ with respect to the total amount of the sintered body. Such a abrasion-resistant sintered body substantially does not contain Si, in other words, contains Si as an impurity, and a bonding force between alumina crystal grains is not so large. Therefore, sintered body processing, particularly, grinding resistance is reduced and improve processability is improved.

Also, the abrasion-resistant sintered body of the present invention is characterized in that Mn and Ti are contained in the sintered body, and Mn and Ti exist as a $MnTiO_3$ family crystal. Although glass containing Mn, Ti, and Si existing in the sintered body as an impurity is readily generated in such an abrasion-resistant sintered body, the generation of glass in the sintered body is suppressed since Mn and Ti in the sintered body exist as the $MnTiO_3$ family crystal, thereby improving a free-machining property.

A sliding member of the present invention is characterized in that at least a sliding surface is made of the aforementioned abrasion-resistant sintered body. The sliding member is dense and has high strength due to the open porosity of 0.1% or less, and can suppress abrasion since a ceramic member slides on a surface of the large diameter alumina grain.

A pump of the present invention comprises a shaft and a bearing, and the pump is characterized in that at least one of the shaft and the bearing is made from the aforementioned sliding member. The pump is dense and has high strength due to the open porosity of the shaft or the bearing of 0.1% or less. Also, it is possible to suppress abrasion of the shaft and improve durability of the pump since the shaft penetrates the bearing to cause the large diameter alumina grains on an outer surface of the shaft to abut and slide on an inner surface of the bearing. Further, in the case where a structure of substantially not containing Si in the grain boundary phase is adopted, it is possible to reduce resistance when grinding the shaft and the bearing, thereby improving processability.

Effect of the Invention

The abrasion-resistant sintered body of the present invention is dense, improved in strength, and capable of suppressing abrasion even in the case where a ceramic member, for example, slides on a surface of the sintered body.

At least a sliding surface of the sliding member of the present invention is dense and has high strength, and the sliding member is capable of suppressing abrasion of the sliding surface even in the case where the sliding member slides on a ceramic member.

In the pump of the present invention, at least a sliding surface of the shaft or the bearing is dense and has high strength, and it is possible to suppress abrasion of the shaft since the shaft penetrates the bearing to cause the large diameter alumina grains on an outer surface of the shaft, for example, to abut and slide on an inner surface of the bearing, thereby improving durability.

BEST MODE FOR CARRYING OUT THE INVENTION

The present invention is hereinafter described in detail. An abrasion-resistant sintered body of the present invention has an open porosity of 0.1% or less and substantially contains alumina crystal grains and a grain boundary phase. The abrasion-resistant sintered body is characterized in that the alumina crystal grains contain large diameter alumina grains 1 having a grain diameter of 10 μm or more and small diameter alumina grains 3 having a grain diameter of 5 μm or less as shown in FIG. 1, and an area rate of the large diameter alumina grains 1 on a surface of the sintered body is 35% to 65%.

It is desirable that the abrasion-resistant sintered body of the present invention is formed of 90 to 98 mass % of alumina and 2 to 10 mass % of the grain boundary phase. More specifically, it is desirable that the sintered body contains 90 to 98 mass % of Al in terms of $Al_2O_3$ with respect to the total amount of the sintered body. Generally, if the sintered body contains 90 to 98 mass % of Al in terms of $Al_2O_3$ with respect to the total amount of the sintered body, a stable liquid phase mainly consisting of $SiO_2$ is formed for promoting sintering. Since the fine crystal grains are reduced by a dissolution and precipitation mechanism due to the formation of a liquid phase, a binodal structure containing the large diameter alumina grains 1 of the grain diameter of 10 μm or more and the small diameter alumina grains 3 of the grain diameter of 5 μm or less is not formed, and a structure having uniformly grown grains is formed. Since the amount of $SiO_2$ to be added is reduced in the present invention, part of the added auxiliary agent component becomes a crystal to suppress alumina grain growth, and the grain growth is promoted due to the irregularly distributed liquid phase containing the small amount of $SiO_2$. It is therefore considered that the binodal structure is obtained even in the case where the sintered body contains 90 to 98 mass % of Al in terms of $Al_2O_2$ with respect to the total amount of the sintered body. As will be described later, a small amount of a crystal other than that of alumina may be precipitated.

In the present invention, the "grain diameter" means a diameter that is detected by: forming a sintered body surface on which the shape of each crystal grain is confirmed by performing mirror processing on a sintered body section, followed by thermal etching; calculating the area of an alumina crystal grain by image analysis of a micrograph of the sintered body surface; and calculating the diameter from the area by assuming that a section of the grain is circular. As used herein, the "sintered body surface" means a surface on which grinding processing has been performed.

Figure 1:
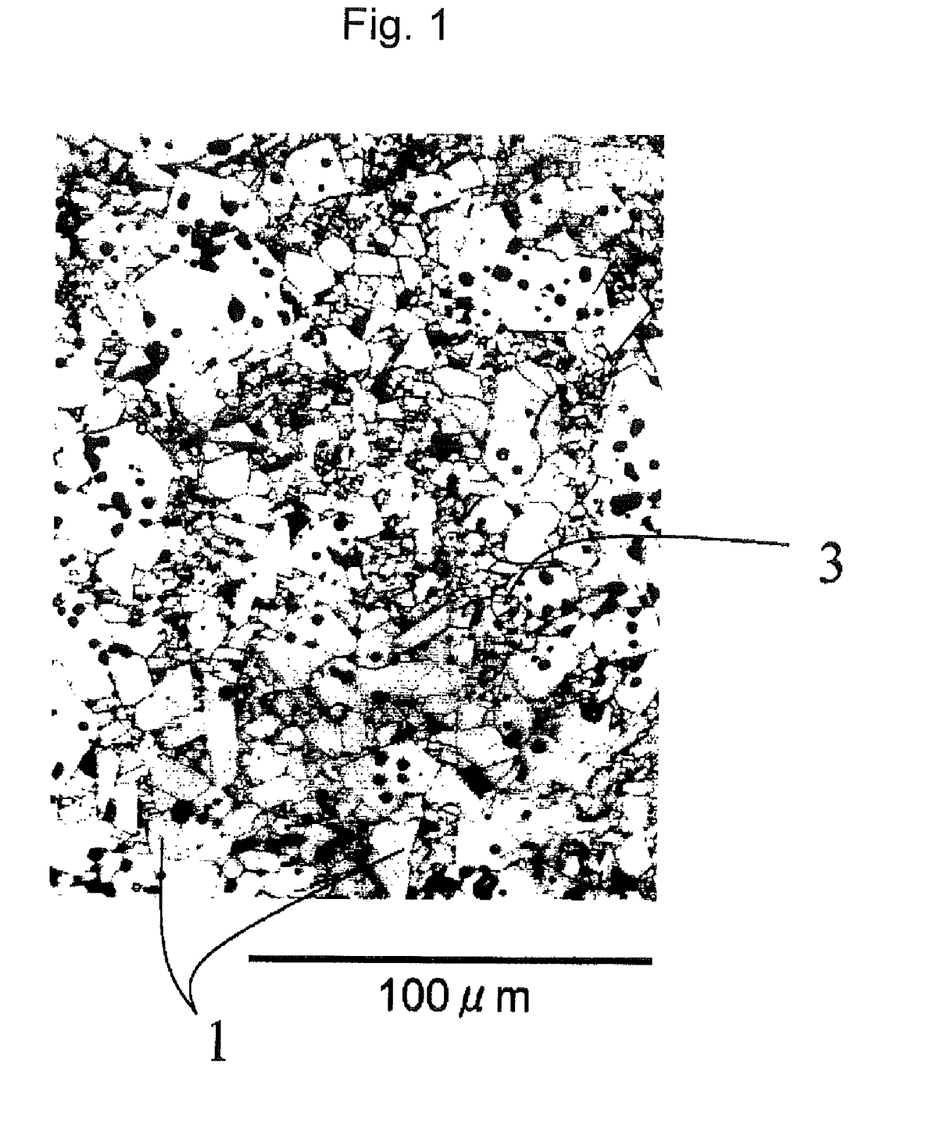
FIG. 1 A drawing showing a surface of an abrasion-resistant sintered body of the present invention.

In FIG. 1, alumina grains having grain diameters of 5 to 10 μm, which are intermediate between the large diameter alumina grains 1 and the small diameter alumina grains 3, are also found. It is desirable that the large diameter alumina grains 1 have a grain diameter of 10 to 50 μm since the large diameter alumina grains 1 having a grain diameter exceeding 50 μm make it difficult to cause sintering and to attain the open porosity of 0.1% or less. It is desirable that the small diameter alumina grains 3 have a grain diameter of 5 μm or less, preferably 3 μm or less, since the grain diameter less than 3 μm makes it possible to cause sintering at a lower temperature and to facilitate formation of the binodal structure.

In the abrasion-resistant sintered body of the present invention, it is important that an area rate of the large diameter alumina grains 1 on the sintered body surface is 35 to 65%. Since the area rate of the large diameter alumina grains 1 on the sintered body surface is 35 to 65% in the abrasion-resistant sintered body, a ceramic member slides on a surface of the large diameter alumina grains in the case where the ceramic member is caused to slide on the sintered body surface, thereby suppressing abrasion. The area rate of the large diameter alumina grains 1 is set to 35 to 65% since a abrasion volume is increased in the case where the area rate is less than 35%, and since a sintering property is deteriorated in the case where the area rate exceeds 65%, thereby making it difficult to attain the open porosity of 0.1% or less, resulting in reduction in strength. From the viewpoints of reducing the abrasion volume and improving the sintered body strength, it is desirable that the area rate of the large diameter alumina grains 1 on the sintered body surface is 40 to 60%.

Meanwhile, it is desirable that an area rate of the small diameter alumina grains 3 on the sintered body surface is 15 to 40%. With such an area rate, it is possible to obtain a dense sintered body even when the large diameter alumina grains 1 are present. It is desirable that the area rate of the small diameter alumina grains 3 is 20 to 40% from the viewpoint of obtaining a dense body, and it is particularly desirable that the area rate is 25 to 35% from the viewpoints of obtaining a dense surface, reducing resistance during sliding, and enhancing the strength of the abrasion-resistant sintered body.

In such an abrasion-resistant sintered body, it is possible to improve an abrasion-resistant property by sufficiently receiving a pressing force of the ceramic member by the large diameter alumina grains 1 and suppressing grain removal of the small diameter alumina grains 3 when the ceramic member slides on the sintered body surface, for example.

Also, the open porosity of 0.1% or less is another great characteristic of the present invention. The open porosity of 0.1% or less makes it dense, and thereby contributing to achievement of high strength.

In the abrasion-resistant sintered body of the present invention, 1 mass % or less of Si in terms of $SiO_2$ with respect to the total amount of the sintered body is contained. This means that the addition of Si is encompassed so that the total amount of Si existing as an impurity and the added Si is 1 mass % or less in terms of $SiO_2$ with respect to the total amount of the sintered body. In such a abrasion-resistant sintered body, Si contained in the amount of 1 mass % or less in terms of $SiO_2$ contributes to improvement of strength though grinding resistance is a little increased, and enables to attain sufficient strength even in the case where the sintered body is used for a columnar pump shaft having a small diameter, thereby improving long term reliability of the pump.

Meanwhile, in the abrasion-resistant sintered body of the present invention, the sintered body substantially does not contain Si, that is, contains Si merely as an impurity, in some cases. In such an abrasion-resistant sintered body, a bonding force between the alumina crystal grains is not too high since the sintered body substantially does not contain Si, thereby making it possible to reduce sintered body processing, particularly grinding resistance, resulting in improvement in processability. "Substantially not containing Si in the sintered body" means that Si is not actively added as a grain boundary phase forming component and means the case where 0.22 mass % or less of Si in terms of $SiO_2$ is contained with respect to the total amount of the sintered body.

As the grain boundary phase forming elements, Mn, Ti and at least one of Ba, Ca, Sr, and Mg are contained in addition to aforementioned Si. Precipitation of crystals such as $MnTiO_3$, $MnAl_2O_4$, and $(Ba, Ca, Sr, Mg)Mn_{1.75}AlO_4$ may be confirmed in some cases in the grain boundary of the alumina crystal, and, in the case where a liquid phase (glass) containing Si, Mn, and Ti is formed due to influences of $Al_2O_3$ contained as a main component or $SiO_2$ and the like contained as an impurity, a bonding force between $Al_2O_3$ grains is increased to improve sintered body strength, while grinding resistance is increased.

However, in the case where the added Mn and Ti exist as a $MnTiO_3$ family crystal, the generation of glass containing Si, Mn, and Ti is suppressed to thereby improve a free-machining property. The $MnTiO_3$ family crystal may comprise not only a $MnTiO_3$ crystal but also crystals where Mn and/or Ti of $MnTiO_3$ are partly substituted by other elements, e.g. Ba, Ca, Sr, and Mg.

The abrasion-resistant sintered body of the present invention has an average grain diameter of 2 to 5 µm, as detected by measuring the sintered body surface by using an image processing apparatus.

It is possible to obtain such a abrasion-resistant sintered body by adding and mixing an coarse alumina powder having an average particle diameter of 10 µm or more, an alumina fine powder having an average particle diameter of 3 µm or less, and the grain boundary phase forming material; molding the mixture into a predetermined shape; and firing the molded article under an oxidizing atmosphere at 1200 to 1500° C. for 1 to 3 hours.

A commercially available coarse alumina powder having an alumina content of 99% or more and an average particle diameter of 25 to 40 µm may be used as the coarse alumina powder, and a commercially available low soda alumina powder having an alumina content of 99% or more and an average particle diameter of 1.8 to 3 µm may be used as the fine alumina powder.

As the grain boundary phase forming material, a fine powder of an oxide, a carbonate, or a hydroxide of Si, Mn, Ti, Ba, Sr, Ca, or Mg or of a compound which forms an oxide by firing a composite oxide or the like containing the above-described elements may be used.

The mixing of the raw material powders may be performed by dry mixing. When wet mixing is used, granulation by spray drying or the like and shaping are performed.

When a ball mill or the like is used for performing mixing and pulverization, calcium oxide, chromium oxide, cobalt oxide, magnesium oxide, silica, manganese oxide, or iron oxide may be added from water to be used as a solvent or the balls, but such substances are not problematic insofar as they satisfy the above-specified composition.

In the abrasion-resistant sintered body described above, due to the area rate of 35 to 65% of the large diameter alumina grains of the grain diameter of 10 µm or more on the sintered body surface, it is possible to suppress abrasion even in the case where the ceramic member slides on the sintered body surface since the ceramic member slides on the surface of the large diameter alumina grains. Also, since the abrasion-resistant sintered body of the present invention has the open porosity of 0.1% or less, it is a dense body and has improved strength.

In a sliding member of the present invention, at least a sliding surface is formed of the abrasion-resistant sintered body, and a surface on which a ceramic member slides is a sintered body surface. Examples of the sliding member include a radial or axial friction bearing, a slide ring in a rotatable mechanical seal, a piston or a piston casing for a reciprocating pump, a sealing disk and a control disk for an adjustment/control liquid flow (e.g. those in a valve and a joint) or a gas flow (e.g. a fan) in a low power motor, a lining of a container or a duct, and a guide member in a mill or a guide member such as a screw guide. In the sliding member of the present invention, at least the sliding surface is formed of the abrasion-resistant sintered body, and the entire sliding member may be formed of the abrasion-resistant sintered body of the present invention.

Due to the open porosity of 0.1% or less, the sliding member is dense, has high strength, and is capable of suppressing abrasion since the ceramic member slides on the surface of the large diameter alumina grains.

A pump of the present invention comprises a shaft and a bearing, and at least one of the shaft and the bearing is formed of the sliding member. Examples of the pump include a pump in which a shaft penetrates a ring-like bearing. Due to the open porosity of the shaft or the bearing of 0.1% or less, the pump is dense, has high strength, and is capable of suppressing abrasion of the shaft since the large diameter alumina grains on the outer surface of the shaft contact to an inner surface of the bearing and slide on the inner surface, thereby improving durability of the pump.

Figure 2:
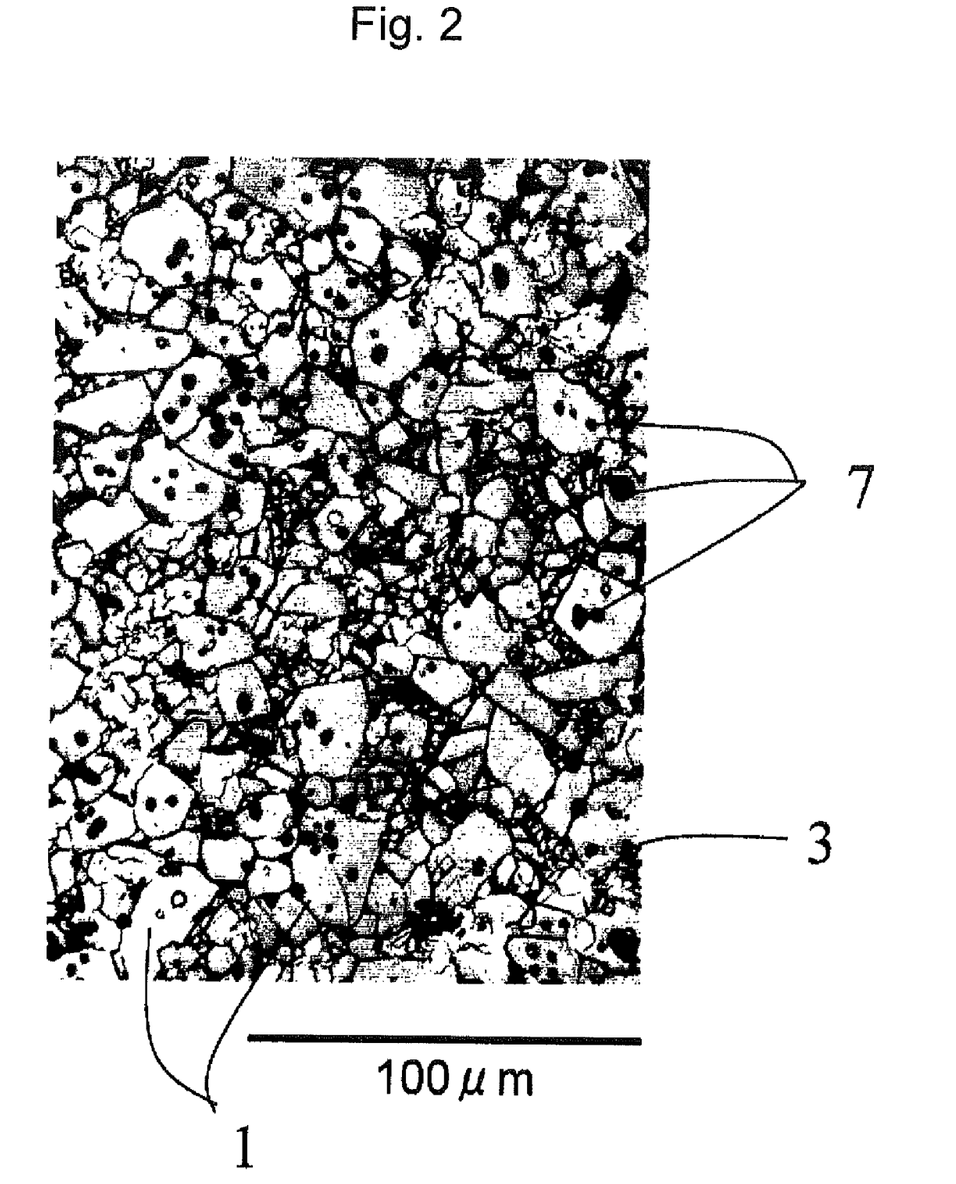
FIG. 2 A drawing showing a surface of another abrasion-resistant sintered body of the present invention.

Also, as show in FIG. 2, the abrasion-resistant sintered body of the present invention desirably has pores 7 inside the large diameter alumina grains 1. One or a plurality of the pores 7 exists inside one large diameter alumina grain 1. The diameter of the pore 7 is 1 to 5 μm when detected assuming from the area of the pore that the shape of the pore is spherical. The pore 7 is, as shown later, taken into the grain when the raw material powders are aggregated and sintered and tends to be generated when using the large diameter raw material powder and the small diameter raw material power and mixing and pulverizing the powders.

In the present invention, it is desirable that the large diameter alumina grains 1 having the pores exist on the sintered body surface at the area rate of 35 to 65%, particularly 40 to 60%. Although the large diameter alumina grains 1 of the grain diameter of 10 μm or more that do not have the pores 7 are present, 80% or more of all of the large diameter alumina grains 1 have the pores 7 on one section of the sintered body. Although the large diameter alumina grains 1 that do not have the pores 7 are found in FIG. 2, the pores 7 are merely not found on that section, and almost all of the large diameter alumina grains 1 comprise the pores 7.

Since the large diameter alumina grains 1 have the pores 7 therein in the abrasion-resistant sintered body of the present invention, it is possible to perform grinding by way of grain removal in the case of grinding processing due to generation of cracks from the pores 7 of the large diameter alumina grains 1, thereby suppressing grinding resistance and improving processability.

It is desirable that the abrasion-resistant sintered body of the present invention contains 0.22 mass % or less of Si in terms of $SiO_2$ with respect to the total amount of the sintered body. Since the abrasion-resistant sintered body substantially does not contain Si, a bonding force between alumina crystal grains is not so high, and, therefore, sintered body processing, particularly, grinding resistance is reduced to make it possible to improve processability. As used herein, "substantially not containing Si in the sintered body" means that Si is not actively added as a grain boundary phase forming component.

In the abrasion-resistant sintered body of the present invention, when mixing and pulverizing the coarse alumina powder and the fine alumina power and firing the mixture, the pulverized coarse alumina powder is sintered after rapidly incorporating the fine alumina powder thereinto, and the pores cannot escape from between the coarse alumina powder and the fine alumina powder to be entrapped therebetween. Therefore, 80% or more of the large diameter alumina particles have the pores.

Example 1

A commercially available alumina powder having an alumina content of 99.6% and an average particle diameter of 25 to 80 μm was used as a coarse alumina powder, and a commercially available low soda alumina powder having an alumina content of 99.8% and an average particle diameter of 1.8 to 3 μm was used as a fine alumina powder. Powders of $MnO_2$, $CaCO_3$, and $SrCO_3$ each having an average particle diameter of 1 μm, a powder of $MgCO_3$ having an average particle diameter of 3.5 μm, and a powder of $TiO_2$ having an average particle diameter of 0.5 μm, whose average particle diameters being measured by a laser scattering method, were used as auxiliary agents.

As a material to which $SiO_2$ is to be mixed, $MnO_2$, $TiO_2$, and one of $MnCO_3$, $CaCO_3$, and $SrCO_3$ as auxiliary agents were weighed to achieve a mass ratio in terms of oxide of $MnO_2$:$TiO_2$:alkali earth metal oxide=3:2:1, and water and an alumina ball having a purity of 93% were thrown into an alumina pot, followed by pulverization for 100 hours (Sample Nos. 1-1, 1-2, 1-3, and 1-16).

In order to prevent mixing with $SiO_2$, $MnO_2$, $TiO_2$, and MgO ($MgCO_3$ was used) were weighed to achieve $MnO_2$:$TiO_2$:MgO=3:2:1, and water and an alumina ball having a purity of 99.9% were thrown into a resin mill, followed by pulverization for 100 hours.

The coarse alumina powder, the fine alumina powder, and the auxiliary agents were added at weight ratios shown in Table 1, and water and 4% of a known binder were added, followed by mixing by using a hand mixer, thereby obtaining slurry. The slurry was dried by using a spray drier to obtain a granule, and pressure molding was performed at a pressure of 1 t/cm$^2$, followed by atmospheric firing at 1370° C.

The open porosity of each of the obtained sintered bodies was measured by an Archimedes method, which is shown in Table 2.

A surface of each of the obtained sintered bodies was subjected to mirror processing and thermal etching at 1200° C., and an area rates % of large diameter alumina grains having a grain diameter of 10 μm or more and an area rate of small diameter alumina grains having a grain diameter of 5 μm or less were measured by using a metallograph and an image analyzing device. The area rate of an area of 200 μm×150 μm was measured based on a metal microscope photograph obtained at a magnification of ×400, and the measured area rates are shown in Table 2. Likewise, an average grain diameter was detected by using an image processing apparatus and the metal microscope photograph obtained at a magnification of ×400. As a result, average grain diameters of the samples of the present invention were 2 to 5 μm.

Figure 3:
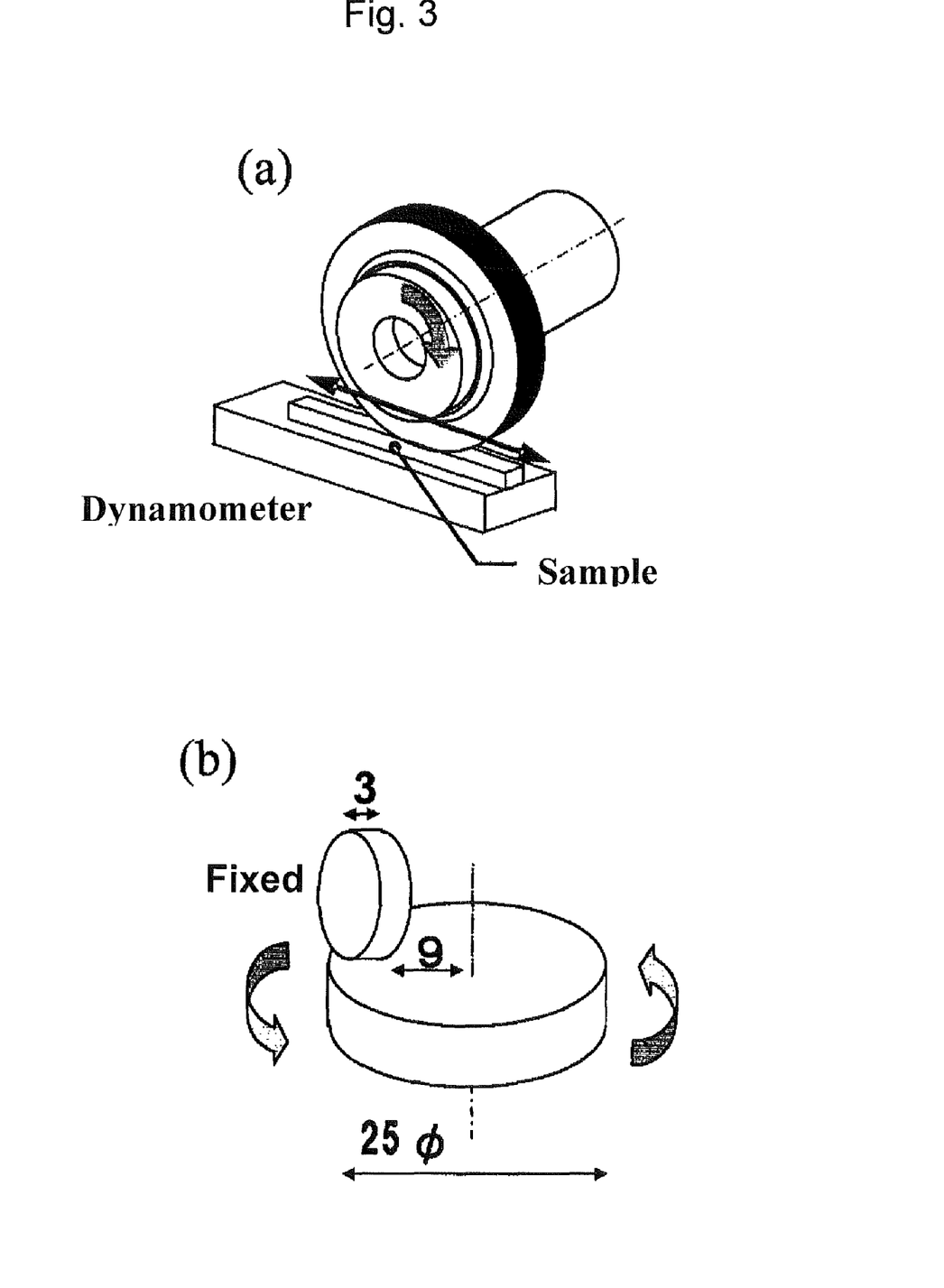
FIG. 3 A drawing showing an evaluation method for the abrasion-resistant sintered body of the present invention, wherein (a) illustrates a grinding resistance test, and (b) illustrates an abrasion evaluation test.

Also, as shown in FIG. 3(a), grinding resistance was measured by setting each of the samples having a shape of 7 mm×100 mm and a thickness of 20 mm onto a flat grinding plate with a dynamometer and using SDC140N7SBA (Asahi Diamond) as a grindstone. Grinding resistance per 1 mm of a sample width in a normal line direction when performing cutting under the conditions of flange cutting (both ends were cut), number of rotations of grindstone: 1800 rpm, grindstone peripheral speed: 1720 m/min, bed feeding speed: 20 m/min, and cutting amount: 0.03 mm/pass was calculated, and the calculated grindstone resistances are shown in Table 2.

An abrasion property was measured by using a disk-like sintered body having a diameter of 25 mm and a thickness of 5 mm and a disk-like sintered body having a diameter of 10 mm and a thickness of 3 mm as shown in FIG. 3(b). The abrasion property was measured by performing a abrasion test of an accumulated traveling distance of 1000 m by pressing an outer periphery of the disk-like sintered body having the diameter of 10 mm and the thickness of 3 mm to the rotating disk-like sintered body having the diameter of 25 mm and the thickness of 5 mm at a position of a abrasion radius of 9 mm at 500 gf, and measuring a width and a depth of a abrasion track on a surface of the disk-like sintered body having the diameter of 25 mm and the thickness of 5 mm using a surface roughness meter. A value obtained by multiplying the measured width and depth of the abrasion track was used as an abrasion evaluation result. The results are shown in Table 2.

Figure 4:
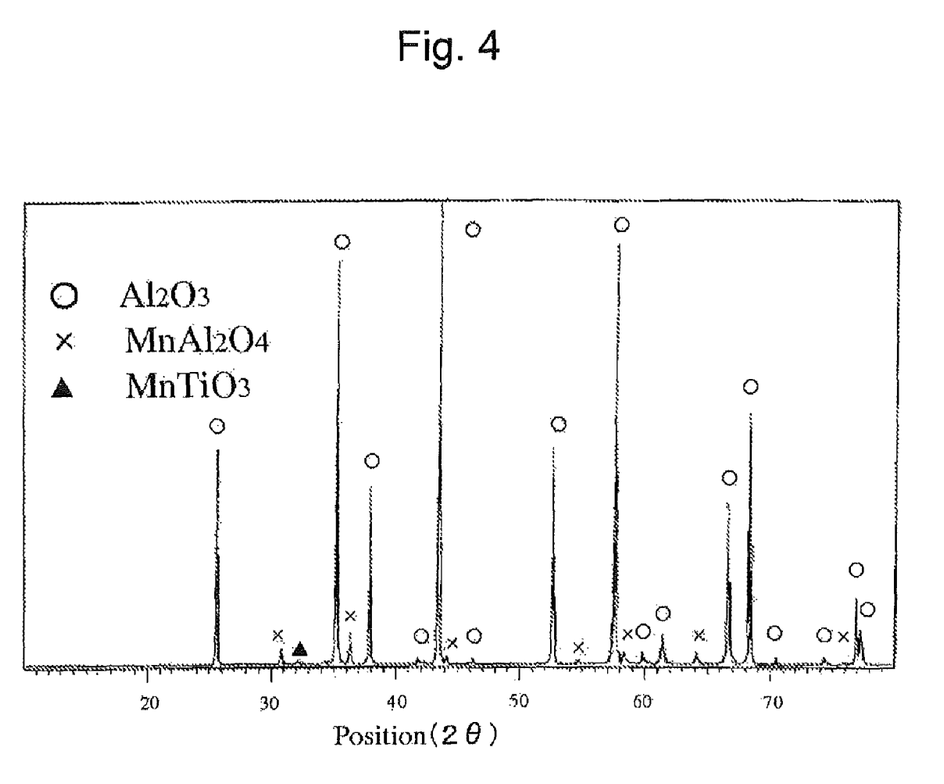
FIG. 4 A diagram showing X ray diffraction of the sample No. 1-6.

A three point bending strength was measured based on JIS R1601. The results are shown in Table 2. A Si amount of each of the sintered bodies was measured by emission spectroscopic analysis (ICP), and the Si amounts in terms of $SiO_2$ are shown in Table 2. As a result of measurement of an Al amount, each of the samples of the present invention contained 90 to 98 mass % of Al in terms of $Al_2O_3$ with respect to the total amount of the sintered body. A crystal phase was identified by an X ray diffraction measurement to detect presence/absence of a $MnTiO_3$ family crystal, and the result is shown in Table 2. The X ray diffraction spectrum of the sample No. 1-6 is shown in FIG. 4.

TABLE 1

| Sample No. | Alumina raw material | | | | | Auxiliary agent | |
|---|---|---|---|---|---|---|---|
| | Coarse powder average particle diameter (μm) | Amount (mass %) | Fine powder average particle diameter (μm) | Amount (mass %) | Total amount (mass %) | Type | Total amount (mass %) |
| *1-1 | 30 | 30 | 1.8 | 55 | 85 | Mn—Ti—Mg—O | 15 |
| 1-2 | 30 | 25 | 1.8 | 67 | 92 | Mn—Ti—Sr—O | 8 |
| 1-3 | 30 | 20 | 1.8 | 75 | 95 | Mn—Ti—Mg—O | 5 |
| 1-4 | 30 | 15 | 1.8 | 83 | 98 | Mn—Ti—Ca—O | 2 |
| *1-5 | 25 | 10 | 3 | 86 | 96 | Mn—Ti—Mg—O | 4 |
| 1-6 | 25 | 20 | 3 | 76 | 96 | Mn—Ti—Mg—O | 4 |
| 1-7 | 25 | 30 | 2 | 66 | 96 | Mn—Ti—Mg—O | 4 |
| 1-8 | 40 | 20 | 2 | 76 | 96 | Mn—Ti—Mg—O | 4 |
| *1-9 | 80 | 20 | 2 | 76 | 96 | Mn—Ti—Mg—O | 4 |
| *1-10 | — | — | 2 | 96 | 96 | Mn—Ti—Mg—O | 4 |
| *1-11 | 30 | 30 | 1.8 | 55 | 85 | Mn—Ti—Mg—O | 15 |
| 1-12 | 30 | 30 | 1.8 | 60 | 90 | Mn—Ti—Mg—O | 10 |
| 1-13 | 30 | 25 | 1.8 | 67 | 92 | Mn—Ti—Mg—O | 8 |
| 1-14 | 30 | 20 | 1.8 | 75 | 95 | Mn—Ti—Mg—O | 5 |
| 1-15 | 30 | 15 | 1.8 | 83 | 98 | Mn—Ti—Mg—O | 2 |
| 1-16 | 30 | 20 | 1.8 | 75 | 95 | Mn—Ti—Mg—Si—O | 5 |

*is a sample out of the scope of the present invention.

TABLE 2

| Sample No. | Alumina grains | | Si content (mass %) | Presence/absence of $MnTiO_3$ crystal | Open porosity (%) | Grinding resistance (N/m) | Abrasion evaluation result (μm²) | Strength (MPa) |
|---|---|---|---|---|---|---|---|---|
| | Area rate of large diameter grains (%) | Area rate of small diameter grains (%) | | | | | | |
| *1-1 | 75 | 4 | 0.55 | Presence | 0.20% | 48 | 2140 | 260 |
| 1-2 | 60 | 18 | 0.46 | Presence | 0.1% or less | 31 | 660 | 300 |
| 1-3 | 45 | 30 | 0.32 | Presence | 0.1% or less | 33 | 730 | 320 |
| 1-4 | 40 | 34 | 0.18 | Presence | 0.1% or less | 26 | 1220 | 350 |
| *1-5 | 31 | 7 | 0.22 | Presence | 0.1% or less | 43 | 2050 | 320 |
| 1-6 | 54 | 20 | 0.22 | Presence | 0.1% or less | 27 | 1170 | 280 |
| 1-7 | 60 | 25 | 0.22 | Presence | 0.1% or less | 24 | 880 | 260 |
| 1-8 | 65 | 11 | 0.22 | Presence | 0.1% or less | 26 | 420 | 210 |
| *1-9 | 69 | 9 | 0.22 | Presence | 0.35% | 18 | 2180 | 110 |
| *1-10 | 0 | 53 | 0.22 | Presence | 0.1% or less | 41 | 2630 | 380 |
| *1-11 | 71 | 9 | 0.15 | Presence | 0.20% | 18 | 2840 | 220 |
| 1-12 | 60 | 19 | 0.15 | Presence | 0.1% or less | 26 | 1740 | 260 |
| 1-13 | 51 | 26 | 0.15 | Presence | 0.1% or less | 29 | 850 | 265 |
| 1-14 | 46 | 33 | 0.15 | Presence | 0.1% or less | 32 | 910 | 285 |
| 1-15 | 35 | 40 | 0.15 | Presence | 0.1% or less | 35 | 1410 | 320 |
| 1-16 | 37 | 38 | 1 | Presence | 0.1% or less | 38 | 1835 | 380 |

*is a sample out of the scope of the present invention.

According to Tables 1 and 2, it is revealed that each of the samples of the present invention, containing the large diameter alumina grains of the grain diameter of 10 μm or more and the small diameter alumina grains of the grain diameter of 5 μm or less and having the area rate of large diameter alumina grains of 35 to 65% and the open porosity of 0.1% or less, is dense and has a strength of 210 MPa or more due to the open porosity of 0.1% or less, and that each of the samples has the small abrasion evaluation result of 1835 μm$^2$ or less due to the area rate of the large diameter alumina grains of 35 to 65%.

Also, it is revealed that the grinding resistance is reduced to 38 N/m or less by reducing the $SiO_2$ content to 0.46 mass % or less.

In contrast, the sample No. 1-1 of a comparative example containing the large amount of large diameter alumina grains has the large open porosity of 0.2%, and the sample No. 1-9 having the large alumina raw material particle diameter of 80 μm has the large open porosity of 0.35%, and the both are deteriorated in strength. It is revealed that the sample No. 1-5 of a comparative example containing the small amount of the large diameter alumina grains is increased in abrasion volume.

In the sample No. 1-10 using the fine alumina powder raw material alone, the large diameter alumina grains of the grain diameter of 10 μm or more are not present, and an abrasion volume is large.

It is revealed that the sample No. 1-16 in which the Si content is 1 mass % in terms of $SiO_2$ (the case where 0.7 mass % of the $SiO_2$ powder was added) is increased in strength and achieves the good abrasion-resistant property though the grinding resistance is increased.

Example 2

A commercially available alumina powder having an alumina content of 99% or more and an average particle diameter of 25 to 80 μm was used as an coarse alumina powder, and a commercially available low soda alumina powder having an alumina content of 99.8% and an average particle diameter of 1.8 to 3 μm was used as an fine alumina powder. Powders of $MnO_2$, $BaCO_3$, $SrCO_3$, and $CaCO_3$ each having an average particle diameter of 1 μm, a powder of $MgCO_3$ having an average particle diameter of 3.5 μm, and a powder of $TiO_2$ having an average particle diameter of 0.5 μm, whose average particle diameters being measured by a laser scattering method, were used as auxiliary agents.

As the auxiliary agents, $MnO_2$, $TiO_2$, and one of $MgCO_3$, $CaCO_3$, $SrCO_3$, and $BaCO_3$ that are carbonates of an alkali earth metal were weighed to achieve a mass ratio in terms of oxide of $MnO_2$:$TiO_2$:alkali earth metal oxide=3:2:1.

0.3 mass % of the $SiO_2$ powder was added to the sample No. 2-1 having a Si content of 0.55 mass % in terms of $SiO_2$, and 1.2 mass % of the $SiO_2$ powder was added to the sample No. 2-11 having a Si content of 1.5 mass % in terms of $SiO_2$.

The alumina powders and the auxiliary agents were mixed as shown in Table 3, and the mixture was poured into a resin mill together with an alumina ball and water, followed by mixing for 12 hours. The particle diameter after the mixing was measured by a laser scattering method and found 10 μm or less. 4% of a known binder was added to the obtained powder, followed by granulation to obtain a granule, and the granule was molded by using a metal mold at a pressure of 1 t/cm$^2$, followed by firing at 1400° C.

The open porosity of each of the obtained sintered bodies was measured by an Archimedes method, and the measured open porosities are shown in Table 4.

A surface of each of the obtained sintered bodies was subjected to mirror processing and heat etching at 1200° C., and an area rate of the whole large diameter alumina grains having a grain diameter of 10 μm or more, an area rate of large diameter alumina grains having a grain diameter of 10 μm or more and having pores, and an area rate of small diameter alumina grains having a grain diameter of 5 μm or less were measured by using a metallograph and an image analyzing device. The results are shown in Table 4. The area rate of an area of 200 μm×150 μm was measured based on a metal microscope photograph obtained at a magnification of ×400. Likewise, an average grain diameter was detected by using an image processing apparatus and the metal microscope photograph obtained at a magnification of ×400. As a result, average grain diameters of the samples of the present invention were 2 to 5 μm.

Grinding resistance, an abrasion property, and three point bending strength were measured in the same manner as in Example 1. The results are shown in Table 4.

A Si amount of each of the sintered bodies was measured by emission spectroscopic analysis (ICP), and the Si amounts in terms of $SiO_2$ are shown in Table 4. As a result of measurement of an Al amount, each of the samples of the present invention contained 90 to 98 mass % of Al in terms of $Al_2O_2$ with respect to the total amount of the sintered body. A crystal phase was identified by an X ray diffraction measurement to detect presence/absence of a $MnTiO_3$ family crystal, and the result is shown in Table 4.

TABLE 3

| | Alumina raw material | | | | | Auxiliary agent | |
| --- | --- | --- | --- | --- | --- | --- | --- |
| Sample No. | Coarse powder average particle diameter (μm) | Amount (mass %) | Fine powder average particle diameter (μm) | Amount (mass %) | Total amount (mass %) | Type | Total amount (mass %) |
| *2-1 | 30 | 30 | 1.8 | 55 | 85 | Mn—Ti—Mg—O | 15 |
| 2-2 | 30 | 30 | 1.8 | 60 | 90 | Mn—Ti—Ba—O | 10 |
| 2-3 | 30 | 25 | 1.8 | 67 | 92 | Mn—Ti—Sr—O | 8 |
| 2-4 | 30 | 20 | 1.8 | 75 | 95 | Mn—Ti—Mg—O | 5 |
| 2-5 | 30 | 15 | 1.8 | 83 | 98 | Mn—Ti—Ca—O | 2 |
| 2-6 | 25 | 20 | 3 | 76 | 96 | Mn—Ti—Mg—O | 4 |
| 2-7 | 25 | 30 | 2 | 66 | 96 | Mn—Ti—Mg—O | 4 |
| 2-8 | 40 | 20 | 2 | 76 | 96 | Mn—Ti—Mg—O | 4 |
| *2-9 | 80 | 20 | 2 | 76 | 96 | Mn—Ti—Mg—O | 4 |
| *2-10 | — | — | 2 | 96 | 96 | Mn—Ti—Mg—O | 4 |
| *2-11 | 30 | 20 | 1.8 | 74 | 94 | Mn—Ti—Mg—Si—O | 6 |

*is a sample out of the scope of the present invention.

TABLE 4

| Sample No. | Alumina grains | | | Si content (mass %) | Presence/ absence of MnTiO$_3$ crystal | Open porosity (%) | Grinding resistance (N/m) | Abrasion evaluation result (μm$^2$) | Strength (MPa) |
|---|---|---|---|---|---|---|---|---|---|
| | Area rate of large diameter grains (%) | Area rate of large diameter grains having pores (%) | Area rate of small diameter grains (%) | | | | | | |
| *2-1 | 75 | 72 | 7 | 0.55 | Presence | 0.20% | 21 | 2790 | 230 |
| 2-2 | 61 | 59 | 16 | 0.15 | Presence | 0.1% or less | 22 | 1780 | 250 |
| 2-3 | 56 | 52 | 25 | 0.15 | Presence | 0.1% or less | 24 | 860 | 270 |
| 2-4 | 48 | 47 | 33 | 0.15 | Presence | 0.1% or less | 28 | 930 | 280 |
| 2-5 | 38 | 35 | 39 | 0.15 | Presence | 0.1% or less | 30 | 1420 | 310 |
| 2-6 | 52 | 51 | 21 | 0.22 | Presence | 0.1% or less | 22 | 1370 | 260 |
| 2-7 | 60 | 59 | 26 | 0.22 | Presence | 0.1% or less | 19 | 980 | 240 |
| 2-8 | 65 | 65 | 18 | 0.22 | Presence | 0.1% or less | 21 | 450 | 200 |
| *2-9 | 78 | 76 | 14 | 0.22 | Presence | 0.30% | 16 | 2280 | 90 |
| *2-10 | 0 | 0 | 53 | 0.22 | Presence | 0.1% or less | 43 | 2720 | 385 |
| *2-11 | 31 | 0 | 62 | 1.5 | Absence | 0.1% or less | 55 | 2910 | 410 |

*is a sample out of the scope of the present invention.

According to Tables 3 and 4, it is revealed that each of the samples 2-2 to 2-8 of the present invention, containing the large diameter alumina grains of the grain diameter of 10 μm or more and the small diameter alumina grains of the grain diameter of 5 μm or less, having the pores inside the large diameter alumina grains, and having the open porosity of 0.1% or less, is dense and has the strength of 200 MPa or more due to the open porosity of 0.1% or less, and that each of the samples has the small grinding resistance of 30 N/m or less and the small abrasion evaluation result of 1780 μm$^2$ or less since the pores are present inside the large diameter alumina grains.

In contrast, the sample No. 2-1 of a comparative example containing the large amount of large diameter alumina grains has the large open porosity of 0.2%, and the sample No. 2-9 having the large alumina raw material particle diameter of 80 μm has the large open porosity of 0.3%, and the both are deteriorated in strength.

In the sample No. 2-10 using the fine alumina powder raw material alone, the large diameter alumina grains of the grain diameter of 10 μm or more are not present, the grinding resistance is large, and an abrasion volume is large.

It is revealed that, in the sample No. 2-11 having the Si content of 1.5 mass % in terms of SiO$_2$ (the case where 1.2 mass % of the SiO$_2$ powder was added), the binodal structure formed of the large diameter alumina grains and the small diameter alumina grains is not formed satisfactorily, and the structure thereof was uniform like that of an ordinary alumina sintered body.

DESCRIPTION OF REFERENCE NUMERALS

1: large diameter alumina grains
3: small diameter alumina grains
7: pores

The invention claimed is:

1. An abrasion-resistant sintered body comprising MnTiO$_3$ crystal grains, alumina crystal grains and a grain boundary phase, and having an open porosity of 0.1% or less, the alumina crystal grains comprising:
   a large diameter alumina grain having a grain diameter of 10 μm or more; and
   a small diameter alumina grain having a grain diameter of 5 μm or less,
   wherein an area rate of the large diameter alumina grain on a surface of the sintered body is 35% to 65%.

2. The abrasion-resistant sintered body according to claim 1, wherein an area rate of the small diameter alumina grain on the sintered body surface is 15% to 40%.

3. The abrasion-resistant sintered body according to claim 1, wherein the large diameter alumina grain has one or more pores therein.

4. The abrasion-resistant sintered body according to claim 1, wherein the sintered body comprises 90 to 98 mass % of Al in terms of Al$_2$O$_3$ with respect to the total amount of the sintered body.

5. The abrasion-resistant sintered body according to claim 1, wherein the sintered body comprises 1 mass % or less of Si in terms of SiO$_2$ with respect to the total amount of the sintered body.

6. The abrasion-resistant sintered body according to claim 1, wherein the sintered body comprises 0.22 mass % or less of Si in terms of SiO$_2$ with respect to the total amount of the sintered body.

7. A sliding member, wherein at least a sliding surface is formed of the abrasion-resistant sintered body according to claim 1.

8. A pump comprising a shaft and a bearing, wherein at least one of the shaft and the bearing comprises a sliding surface that is an abrasion-resistant sintered body comprising alumina crystal grains and a grain boundary phase, and having an open porosity of 0.1% or less, the alumina crystal grains comprising:
   a large diameter alumina grain having a grain diameter of 10 μm or more; and
   a small diameter alumina grain having a grain diameter of 5 μm or less,
   wherein an area rate of the large diameter alumina grain on a surface of the sintered body is 35% to 65%.

* * * * *